US010086830B2

(12) United States Patent
Myers et al.

(10) Patent No.: US 10,086,830 B2
(45) Date of Patent: Oct. 2, 2018

(54) ACCIDENT ATTENUATION SYSTEMS AND METHODS

(71) Applicant: Ford Global Technologies, LLC, Dearborn, MI (US)

(72) Inventors: Scott Vincent Myers, Camarillo, CA (US); Alexandru Mihai Gurghian, Palo Alto, CA (US); Mohamed Ahmad, Mountain View, CA (US); Nikhil Nagraj Rao, Union City, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 151 days.

(21) Appl. No.: 15/162,290

(22) Filed: May 23, 2016

(65) Prior Publication Data

US 2017/0334440 A1    Nov. 23, 2017

(51) Int. Cl.
*B60W 30/08*   (2012.01)
*B60W 10/10*   (2012.01)
(Continued)

(52) U.S. Cl.
CPC .......... *B60W 30/085* (2013.01); *B60W 10/10* (2013.01); *B60W 10/18* (2013.01); *B60W 10/20* (2013.01); *B60W 10/30* (2013.01); *B60W 30/0953* (2013.01); *B60W 2420/42* (2013.01); *B60W 2420/52* (2013.01); *B60W 2420/54* (2013.01); *B60W 2550/302* (2013.01); *B60W 2550/308* (2013.01); *B60W 2710/10* (2013.01); *B60W 2710/18* (2013.01); *B60W 2710/20* (2013.01); *B60W 2710/30* (2013.01)

(58) Field of Classification Search
CPC .... B60W 30/085; B60W 10/18; B60W 10/20; B60W 10/30; B60W 30/0953; B60W 10/10
See application file for complete search history.

(56) References Cited

U.S. PATENT DOCUMENTS

| 9,555,801 B2 * | 1/2017 | Yester | B60W 30/09 |
| 2007/0152803 A1 * | 7/2007 | Huang | B60Q 1/525 340/435 |

(Continued)

FOREIGN PATENT DOCUMENTS

| JP | 2007314015 A | 12/2007 |
| JP | 2009234517 A | 10/2009 |

(Continued)

*Primary Examiner* — Yonel Beaulieu
*Assistant Examiner* — Martin A Weeks
(74) *Attorney, Agent, or Firm* — David R. Stevens; Stevens Law Group

(57) ABSTRACT

Example accident attenuation systems and methods are described. In one implementation, a method determines a speed of a second vehicle approaching from behind a first vehicle and determines a distance between the first and second vehicles. The method also determines whether the second vehicle can stop before colliding with the first vehicle. If the second vehicle cannot stop before colliding with the first vehicle, the method takes action to attenuate the potential collision by applying full brake force, tightening seat belts, and/or turning the front wheels of the first vehicle to direct the first vehicle away from oncoming traffic.

11 Claims, 7 Drawing Sheets

(51) Int. Cl.
*B60W 10/20* (2006.01)
*B60W 10/30* (2006.01)
*B60W 30/09* (2012.01)
*B60W 30/085* (2012.01)
*B60W 10/18* (2012.01)
*B60W 30/095* (2012.01)

(56) References Cited

U.S. PATENT DOCUMENTS

| | | | |
|---|---|---|---|
| 2013/0054103 A1* | 2/2013 | Herink | B60T 7/22 |
| | | | 701/65 |
| 2014/0303845 A1* | 10/2014 | Hartmann | B60W 10/18 |
| | | | 701/41 |
| 2015/0224845 A1* | 8/2015 | Anderson | B60G 17/019 |
| | | | 701/37 |
| 2015/0258991 A1 | 9/2015 | Fletcher | |
| 2015/0332590 A1* | 11/2015 | Salomonsson | G08G 1/167 |
| | | | 701/28 |
| 2017/0001636 A1* | 1/2017 | Laur | B60W 30/09 |
| 2017/0158192 A1* | 6/2017 | Kupka | B60W 30/0956 |

FOREIGN PATENT DOCUMENTS

| | | |
|---|---|---|
| JP | 2013053962 A | 3/2013 |
| KR | 20130070222 A | 6/2013 |

\* cited by examiner

ACCIDENT ATTENUATION SYSTEMS AND METHODS

TECHNICAL FIELD

The present disclosure relates to vehicular systems and, more particularly, to systems and methods that detect, and attenuate the severity of, potential accidents.

BACKGROUND

Automobiles and other vehicles provide a significant portion of transportation for commercial, government, and private entities. In areas with heavy vehicle traffic or limited visibility, accidents can occur regularly. In these areas, a driver can become distracted by the other vehicles traveling in different directions and may not see certain vehicles due to visibility limitations which increases the likelihood of an accident. In some situations, when a collision occurs between two vehicles, the impact may cause one or both of the vehicles to travel into oncoming traffic, other vehicles, pedestrians, or other hazards. Therefore, it is desirable to predict potential collisions and take steps to attenuate the severity of the potential collision.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
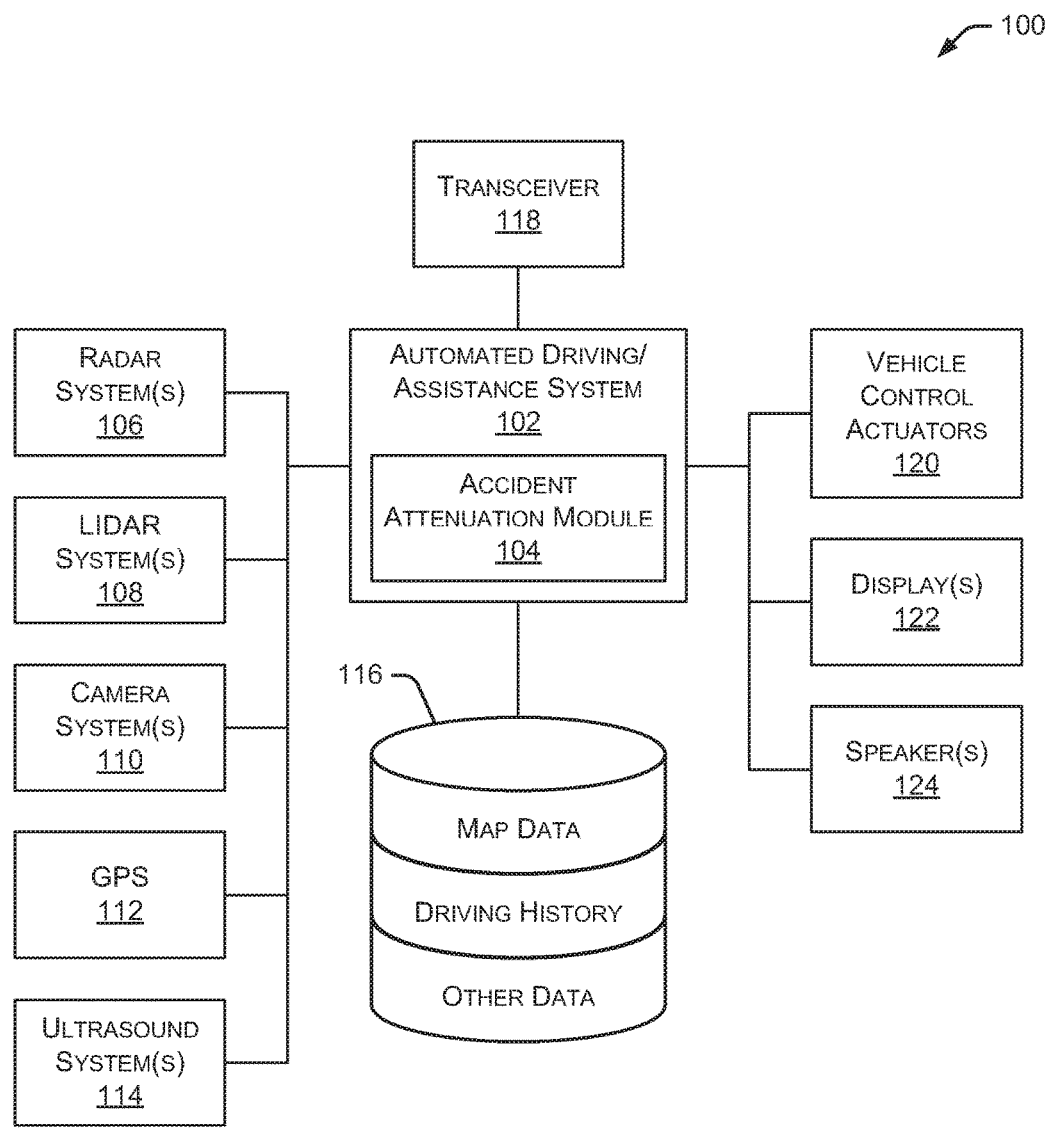
FIG. 1 is a block diagram illustrating an embodiment of a vehicle control system that includes an automated driving/assistance system.

In the following disclosure, reference is made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter is described in language specific to structural features and/or methodological acts, it is to be understood that the subject matter defined in the appended claims is not necessarily limited to the described features or acts described herein. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed herein may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure are directed to computer program products comprising such logic (e.g., in the form of software) stored on any computer useable medium. Such software, when executed in one or more data processing devices, causes a device to operate as described herein.

The disclosure relates generally to methods, systems, and apparatuses for automated or assisted driving and, more particularly, relates to detecting a potential collision between two vehicles and taking steps to attenuate the severity of the potential collision. According to one embodiment, a method uses a rear-facing camera mounted to a first vehicle to detect a second vehicle approaching from behind the first vehicle. The method also determines a speed of the second vehicle and determines a distance between the first vehicle and the second vehicle. Based on the speed of the second vehicle and the distance between the first and second vehicles, the method determines whether the second vehicle can stop before colliding with the first vehicle. If the method determines that the second vehicle cannot stop before colliding with the first vehicle, one or more actions are taken to attenuate the severity of the potential collision. For example, the action taken may include one or more of applying full brake force, tightening seat belts, and turning the front wheels of the first vehicle to direct the first vehicle away from oncoming traffic.

FIG. 1 is a block diagram illustrating an embodiment of a vehicle control system 100 that may be used to detect a potential collision between two vehicles and take steps to attenuate the severity of the potential collision. An automated driving/assistance system 102 may be used to automate or control operation of a vehicle or to provide assistance to a human driver. For example, the automated driving/assistance system 102 may control one or more of braking, steering, seat belt tension, acceleration, lights, alerts, driver notifications, radio, or any other auxiliary systems of the vehicle. In another example, the automated driving/assistance system 102 may not be able to provide any control of the driving (e.g., steering, acceleration, or braking), but may provide notifications and alerts to assist a human driver in driving safely. The automated driving/assistance system 102 may include an accident attenuation module 104 that uses vehicle sensor data and one or more processors to detect a potential collision between two vehicles and take steps to attenuate the severity of the potential collision. In one embodiment, the automated driving/assistance system 102 may determine a driving maneuver or driving path to attenuate the severity of a likely collision.

The vehicle control system 100 also includes one or more sensor systems/devices for detecting a presence of nearby objects or determining a location of a parent vehicle (e.g., a vehicle that includes the vehicle control system 100). For example, the vehicle control system 100 may include radar systems 106, one or more LIDAR systems 108, one or more camera systems 110, a global positioning system (GPS) 112, and/or ultrasound systems 114. The one or more camera systems 110 may include a rear-facing camera mounted to the vehicle (e.g., a rear portion of the vehicle). The vehicle control system 100 may include a data store 116 for storing relevant or useful data for navigation and safety, such as map data, driving history, or other data. The vehicle control system 100 may also include a transceiver 118 for wireless communication with a mobile or wireless network, other vehicles, infrastructure, or any other communication system.

The vehicle control system 100 may include vehicle control actuators 120 to control various aspects of the driving of the vehicle such as electric motors, switches or other actuators, to control braking, acceleration, steering, seat belt tension, or the like. The vehicle control system 100 may also include one or more displays 122, speakers 124, or other devices so that notifications to a human driver or passenger may be provided. A display 122 may include a heads-up display, dashboard display or indicator, a display screen, or any other visual indicator, which may be seen by a driver or passenger of a vehicle. The speakers 124 may include one or more speakers of a sound system of a vehicle or may include a speaker dedicated to driver notification.

It will be appreciated that the embodiment of FIG. 1 is given by way of example only. Other embodiments may include fewer or additional components without departing from the scope of the disclosure. Additionally, illustrated components may be combined or included within other components without limitation.

In one embodiment, the automated driving/assistance system 102 is configured to control driving or navigation of a parent vehicle. For example, the automated driving/assistance system 102 may control the vehicle control actuators 120 to drive a path on a road, parking lot, driveway or other location. For example, the automated driving/assistance system 102 may determine a path based on information or perception data provided by any of the components 106-118. The sensor systems/devices 106-110 and 114 may be used to obtain real-time sensor data so that the automated driving/assistance system 102 can assist a driver or drive a vehicle in real-time.

Figure 2:
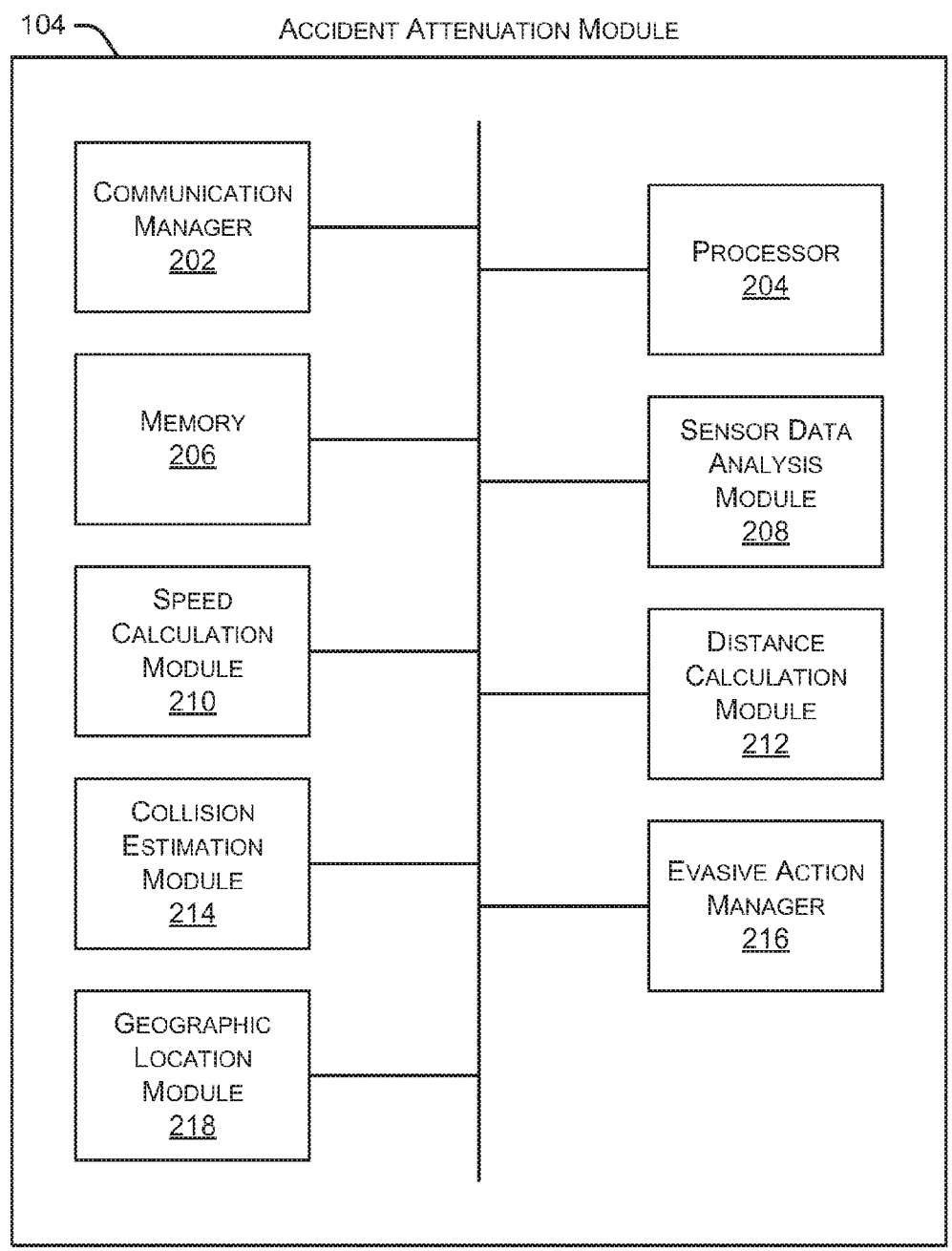
FIG. 2 is a block diagram illustrating an embodiment of an accident attenuation module.

FIG. 2 is a block diagram illustrating an embodiment of an accident attenuation module 104. As shown in FIG. 2, accident attenuation module 104 includes a communication manager 202, a processor 204, and a memory 206. Communication manager 202 allows accident attenuation module 104 to communicate with other systems, such as automated driving/assistance system 102. Processor 204 executes various instructions to implement the functionality provided by accident attenuation module 104 and discussed herein. Memory 206 stores these instructions as well as other data used by processor 204 and other modules contained in accident attenuation module 104.

Additionally, accident attenuation module 104 includes a sensor data analysis module 208 that receives and analyzes data from vehicle sensors, such as radar systems 106, LIDAR systems 108, camera systems 110, GPS 112, and ultrasound systems 114. Additionally, sensor data analysis module 208 may combine (or fuse) data from multiple sensors and analyze the combined data. A speed calculation module 210 determines the speed of an approaching vehicle, such as a vehicle approaching the rear of the vehicle containing the accident attenuation module 104. Speed calculation module 210 uses various sensor data to determine the speed at which the approaching vehicle is traveling. In some embodiments, the sensor data used to determine the speed of the approaching vehicle is a fusion of sensor data including radar sensor data and other types of sensor data, such as LIDAR, ultrasound, and cameras. A distance calculation module 212 determines the distance between the vehicle containing the accident attenuation module 104 and the approaching vehicle. Distance calculation module 212 uses various sensor data to determine the distance between the two vehicles. In some embodiments, the sensor data used to determine the distance between the two vehicles is a fusion of sensor data including radar sensor data and other types of sensor data, such as LIDAR, ultrasound, and cameras.

Accident attenuation module 104 also includes a collision estimation module 214 that determines the likelihood of a collision between the vehicle containing the accident attenuation module and the approaching vehicle. This collision determination is made based on one or more factors, such as the speed of the approaching vehicle, the distance between the two vehicles, the size (or category) of the approaching vehicle, the road surface condition, the estimated braking (or stopping) capability of the approaching vehicle, and the like. In some embodiments, a collision may be detected using V2V (vehicle-to-vehicle) communications, V2I (vehicle-to-infrastructure) communications, or any other communication system. If collision estimation module 214 determines that a collision is likely, then an evasive action manager 216 takes one or more actions to attenuate the severity of the potential collision. For example, evasive action manager 216 may apply full braking force to minimize movement of the vehicle during the collision, tighten the vehicle seat belts to reduce movement of the vehicle occupants during the collision, and turn the front wheels of the vehicle to direct the vehicle away from oncoming traffic or other hazards.

Accident attenuation module 104 further includes a geographic location module 218 that receives GPS data to identify a current geographic location of the vehicle. Based on the current geographic location, the geographic location module 218 can determine road patterns, driving lanes, the vehicle's current lane position, potential locations of oncoming traffic, other driving obstacles or driving hazards, and the like. This information is used, for example, by the evasive action manager 216 in determining what actions to take that will attenuate the severity of the potential collision.

Figure 3:
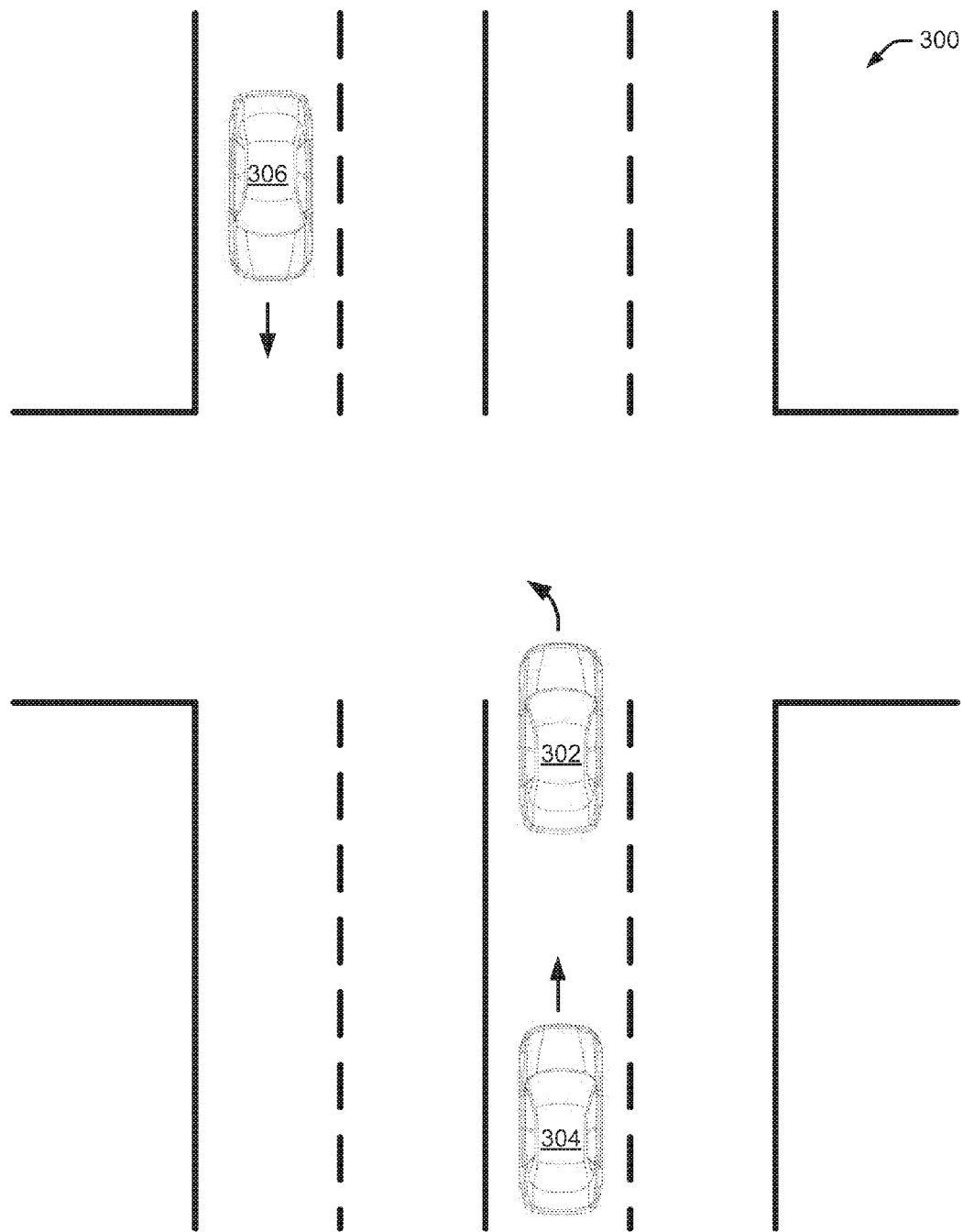
FIG. 3 illustrates an example traffic intersection with multiple vehicles in or approaching the intersection.

FIG. 3 illustrates an example traffic intersection 300 with multiple vehicles in or approaching the intersection. In this example, a vehicle 302 is waiting to turn left at the intersection. In this situation, vehicle 302 is stopped or moving forward slowly. Vehicle 302 is waiting to turn due to the oncoming vehicle 306. Another vehicle 304 is approaching the back of vehicle 302. The accident attenuation module 104 in vehicle 302 senses the approaching vehicle 304 and determines whether a collision is likely (i.e., vehicle 304 drives into the back of vehicle 302). As discussed herein, accident attenuation module 104 may consider multiple factors in determining whether a collision is likely. If a collision is likely, accident attenuation module 104 may take action to attenuate the severity of the potential collision by applying full brake force for vehicle 302, tightening the seat belts in vehicle 302, and determining whether the front wheels of vehicle 302 are positioned to direct the vehicle straight forward in the event of a collision. For example, if the front wheels of vehicle 302 are turned to the left in anticipation of a left turn, a collision would likely push the car into oncoming traffic, such as vehicle 306. However, if the front wheels are turned to a "straight" position, the vehicle would be pushed forward through the intersection instead (staying in the same lane of travel), where it is less likely to collide with an oncoming vehicle. Thus, the accident attenuation module 104 may turn the front wheels of vehicle 302 to a straight position to reduce the likelihood of a subsequent collision with oncoming traffic.

Figure 4:
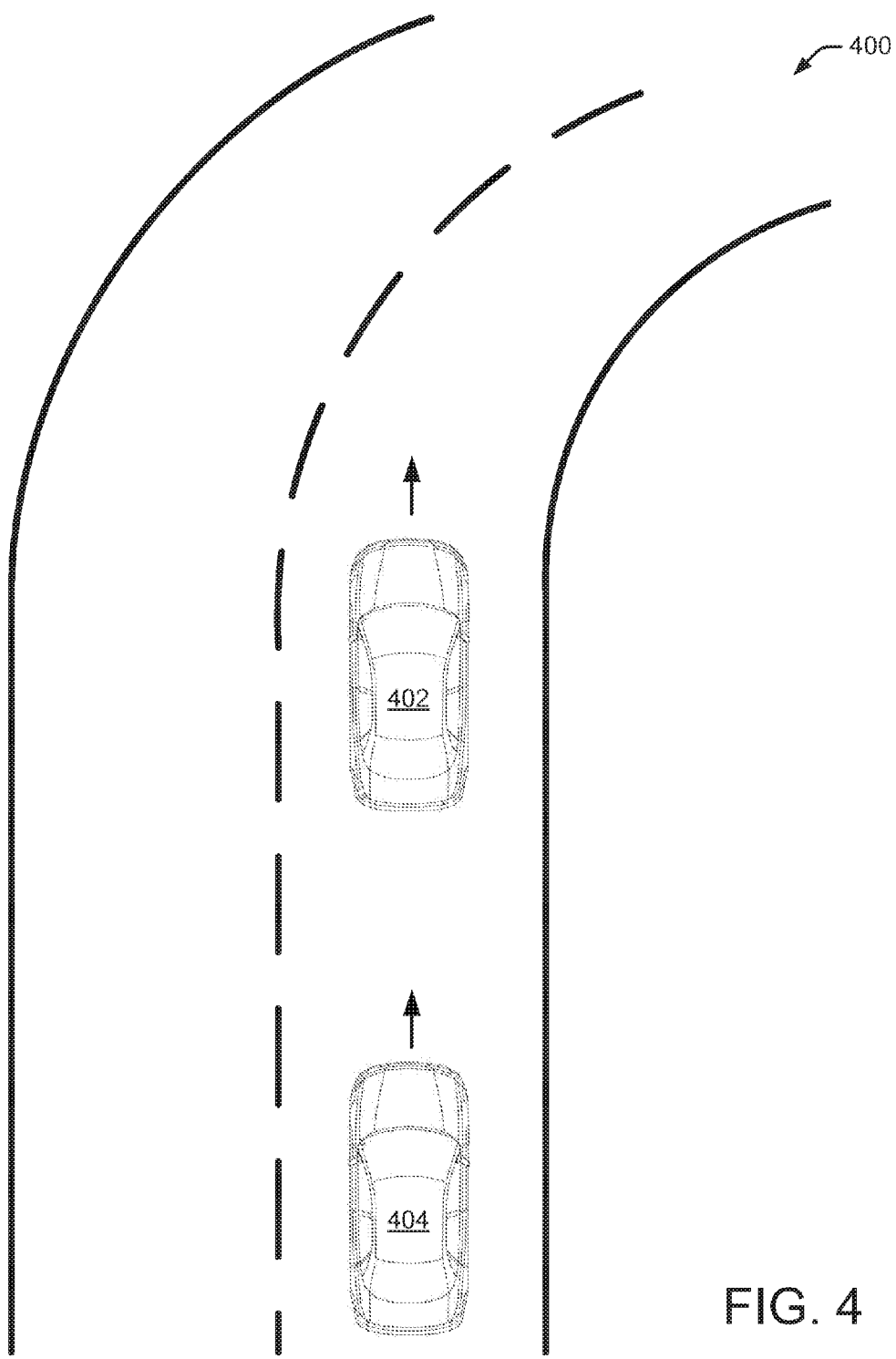
FIG. 4 illustrates an example multiple-lane roadway that includes a curve.

FIG. 4 illustrates an example multiple-lane roadway 400 that includes a curve. In this example, a vehicle 402 is traveling along roadway 400 as it approaches a curve in the road. Another vehicle 404 is approaching vehicle 402 from behind. The accident attenuation module 104 in vehicle 402 senses the approaching vehicle 304 and determines whether a collision is likely (i.e., vehicle 404 drives into the back of vehicle 402). As discussed herein, accident attenuation module 104 may consider multiple factors in determining whether a collision is likely. If a collision is likely, accident attenuation module 104 may take action to attenuate the severity of the potential collision by applying full brake force for vehicle 402, tightening the seat belts in vehicle 402, and determining whether the front wheels of vehicle 402 are positioned to direct the vehicle straight forward in the event of a collision. In this example, the front wheels of vehicle 402 are likely in a "straight" position because the vehicle is moving along a straight portion of roadway 400. If vehicle 404 collides with the rear of vehicle 402 while its front wheels are in the straight position, vehicle 402 may be pushed straight ahead into the oncoming lane of traffic. Therefore, in this situation, if accident attenuation module 104 determines that a collision is likely, it may turn the front wheels of vehicle 402 to the right and reduce the chance of vehicle 402 crossing into oncoming traffic.

In some embodiments, the amount of repositioning of the front wheels varies depending on the speed of the vehicle. In certain situations, vehicle 402 may steer toward the right side of the current lane but still maintain its position within the lane. In other embodiments, the determination of whether to steer the front wheels of vehicle 402 (and the amount of steering applied) may depend on whether the accident attenuation module 104 senses an approaching vehicle in the oncoming lane of traffic. If no oncoming vehicles are detected, the accident attenuation module 104 may be less aggressive in its steering of vehicle 402.

Figure 5:
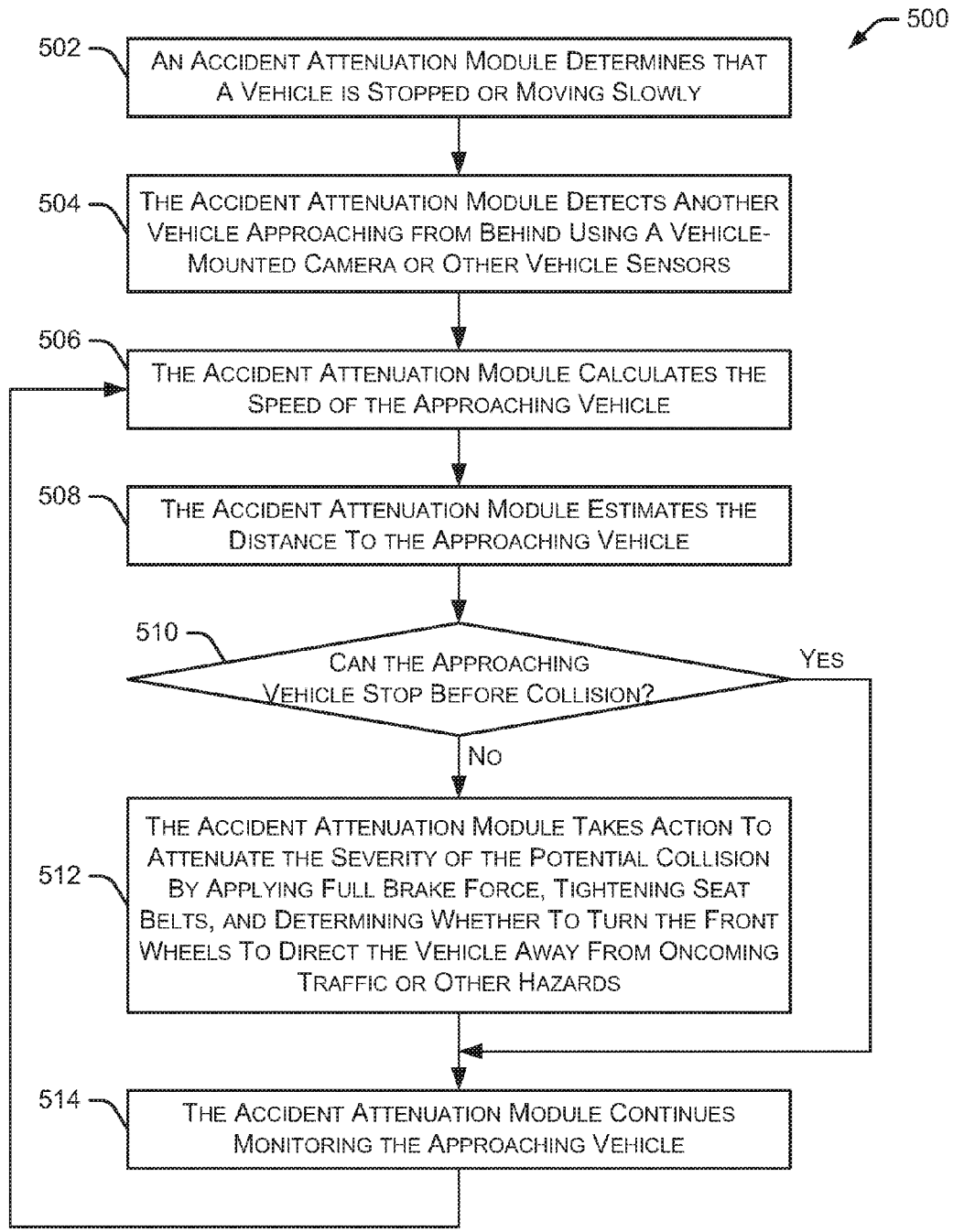
FIG. 5 is a flow diagram illustrating an embodiment of a method for detecting a potential collision and taking steps to attenuate the severity of the potential collision.

FIG. 5 is a flow diagram illustrating an embodiment of a method 500 for detecting a potential collision and taking steps to attenuate the severity of the potential collision. Initially, an accident attenuation module determines that a vehicle is stopped or moving slowly at 502. In some embodiments, the accident attenuation module regularly senses the speed of the vehicle to determine whether or not to detect potential collisions. For example, at vehicle speeds below a threshold speed (such as 5 mph), the system actively monitors approaching vehicles for potential collisions. But, when the vehicle is moving above the threshold speed, the system stops monitoring approaching vehicles for potential collisions. At these higher speeds, the accident attenuation module doesn't want to interfere with regular driving activities. In alternate embodiments, the threshold speed may be significantly higher, thereby causing the accident attenuation module to monitor approaching vehicles at higher speeds. In other embodiments, the system is always active regardless of vehicle speed.

The accident attenuation module detects another vehicle approaching from behind using a vehicle-mounted camera or other vehicle sensors at 504. In some embodiments, one or more radar sensors are used to detect an approaching vehicle and determine the speed of the approaching vehicle. In other embodiments, one or more rear-facing cameras are used to detect the approaching vehicle and determine the speed of the approaching vehicle. When using multiple cameras, the system uses existing depth calculation algorithms and timestamps to determine the approaching vehicle's speed. When using a single camera, the system tracks the shape of the object in over a period of time (e.g., several image frames). If the vehicle is approaching (i.e., getting closer), the size of the object should be increasing as it gets closer to the camera. Using the image frame rate, timestamps, change in object size, and the known speed of the vehicle with the camera, the system can estimate the speed of the approaching vehicle. Specific embodiments may use both a radar sensor and a camera to detect the approaching vehicle and determine its speed.

The accident attenuation module calculates the speed of the approaching vehicle at 506. In some embodiments, the speed of the approaching vehicle is calculated based on the known vehicle speed combined with the rate at which the approaching vehicle is moving closer to the vehicle that contains the accident attenuation module. Next, the accident attenuation module estimates the distance to the approaching vehicle at 508. In some embodiments, the distance to the approaching vehicle is estimated based on radar signals reflected back from the approaching vehicle.

Method 500 continues by determining whether the approaching vehicle can stop before a collision with the vehicle containing the accident attenuation module at 510. Additional details regarding determining whether the approaching vehicle can stop before a collision are discussed with respect to FIG. 6. If the method determines that the approaching vehicle cannot stop before a collision, the accident attenuation module takes action to attenuate the severity of the potential collision at 512. For example, the accident attenuation module may apply full brake force, tighten seat belts, and determine whether to turn the front wheels to direct the vehicle away from oncoming traffic or other hazards. Other hazards include pedestrians, bicyclists, animals, other vehicles, buildings, steep drops at the edge of the roadway, and the like.

If the method determines that the approaching vehicle can stop before a collision, the accident attenuation module continues monitoring the approaching vehicle at 514.

Figure 6:
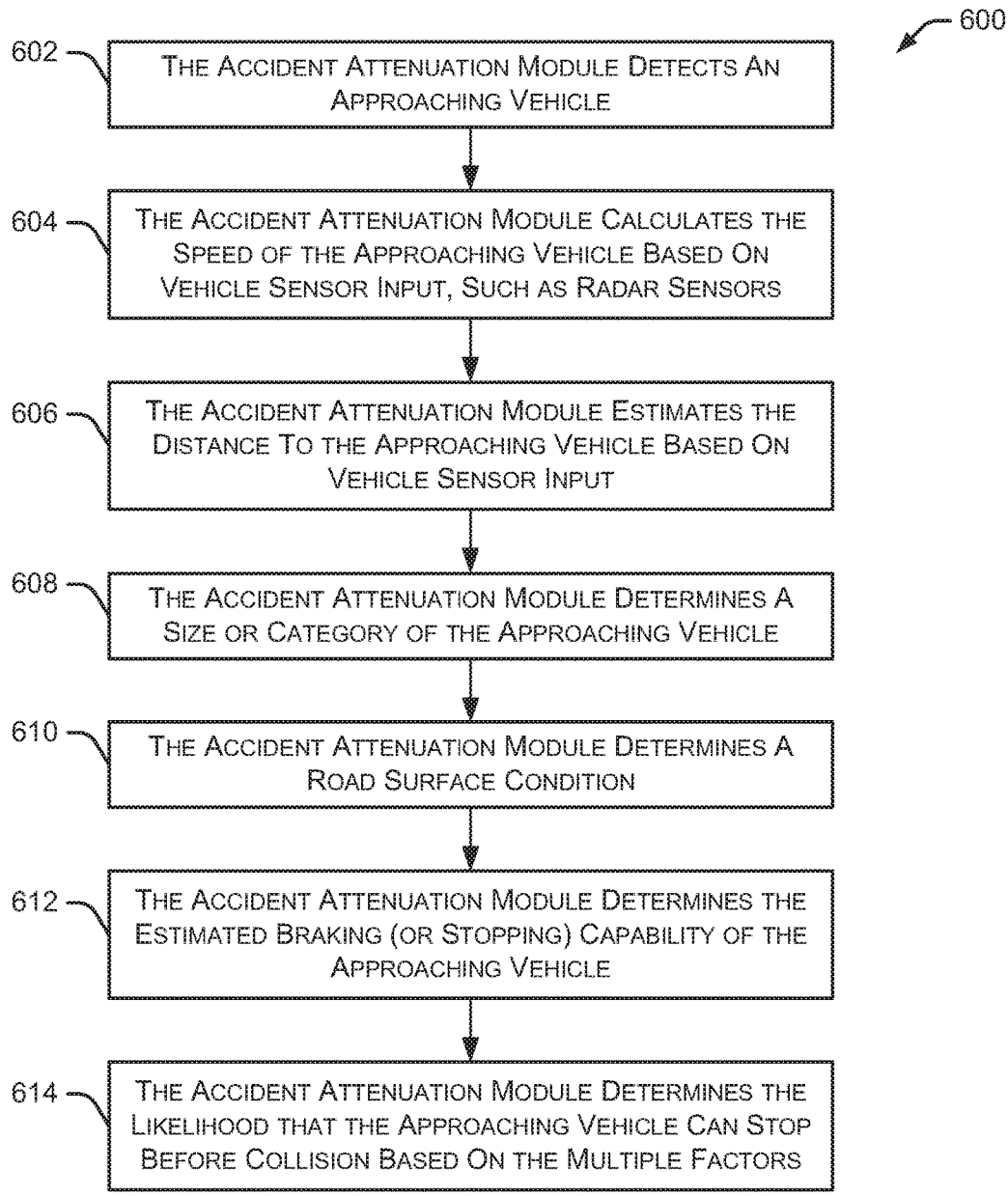
FIG. 6 is a flow diagram illustrating an embodiment of a method for determining the likelihood that an approaching vehicle can stop before a collision.

FIG. 6 is a flow diagram illustrating an embodiment of a method 600 for determining the likelihood that an approaching vehicle can stop before a collision. Initially, the accident attenuation module detects an approaching vehicle at 602 and calculates the speed of the approaching vehicle based on vehicle sensor input at 604, such as one or more radar sensors. The accident attenuation module then estimates the distance to the approaching vehicle based on sensor input from one or more vehicle sensors at 606. Method 600 continues as the accident attenuation module determines a size or category of the approaching vehicle at 608. For example, the size or category of the vehicle may be a small car, a large car, a truck, a delivery truck, a heavy dump truck, and the like. The accident attenuation module may consider the size or category of the vehicle when determining how long it will take the vehicle to stop. For example, a heavy dump truck may take significantly longer to stop than a small car. In some embodiments, the accident attenuation module determines a size or category of the approaching vehicle based on training with images that represent different sizes and categories of vehicles taken from different angles and different perspectives. Additionally, the accident attenuation module may consider the size or category of the vehicle when determining what action to take in response to a potential collision.

The accident attenuation module also determines a road surface condition at 610. Example road surface conditions include dry pavement, wet pavement, snow or icy pavement, gravel road, and the like. The accident attenuation module considers the road surface condition information when determining the stopping distance of the approaching vehicle. For example, a vehicle on wet, snowy or icy pavement will require a longer stopping distance than the same vehicle on dry pavement. In some embodiments, the accident attenuation module approximates a coefficient of friction of the road surface. The method continues as the accident attenuation module determines the estimated braking (or stopping) capability of the approaching vehicle at 612. The accident attenuation module may consider multiple factors when estimating the braking capability of the approaching vehicle, such as the road surface condition mentioned above. Additionally, the accident attenuation module may consider the speed of the approaching vehicle, the distance to the approaching vehicle, the size or category of the approaching vehicle, and the like. Finally, the accident attenuation module determines the likelihood that the approaching vehicle can stop before a collision based on the multiple factors discussed above. Based on the approaching vehicle's speed and the coefficient of friction of the road surface, the accident attenuation module uses a standard stopping distance formula to determine the stopping distance required by the approaching vehicle. If the stopping distance is greater than the current distance between the two vehicles, then there is a high likelihood of a collision.

Figure 7:
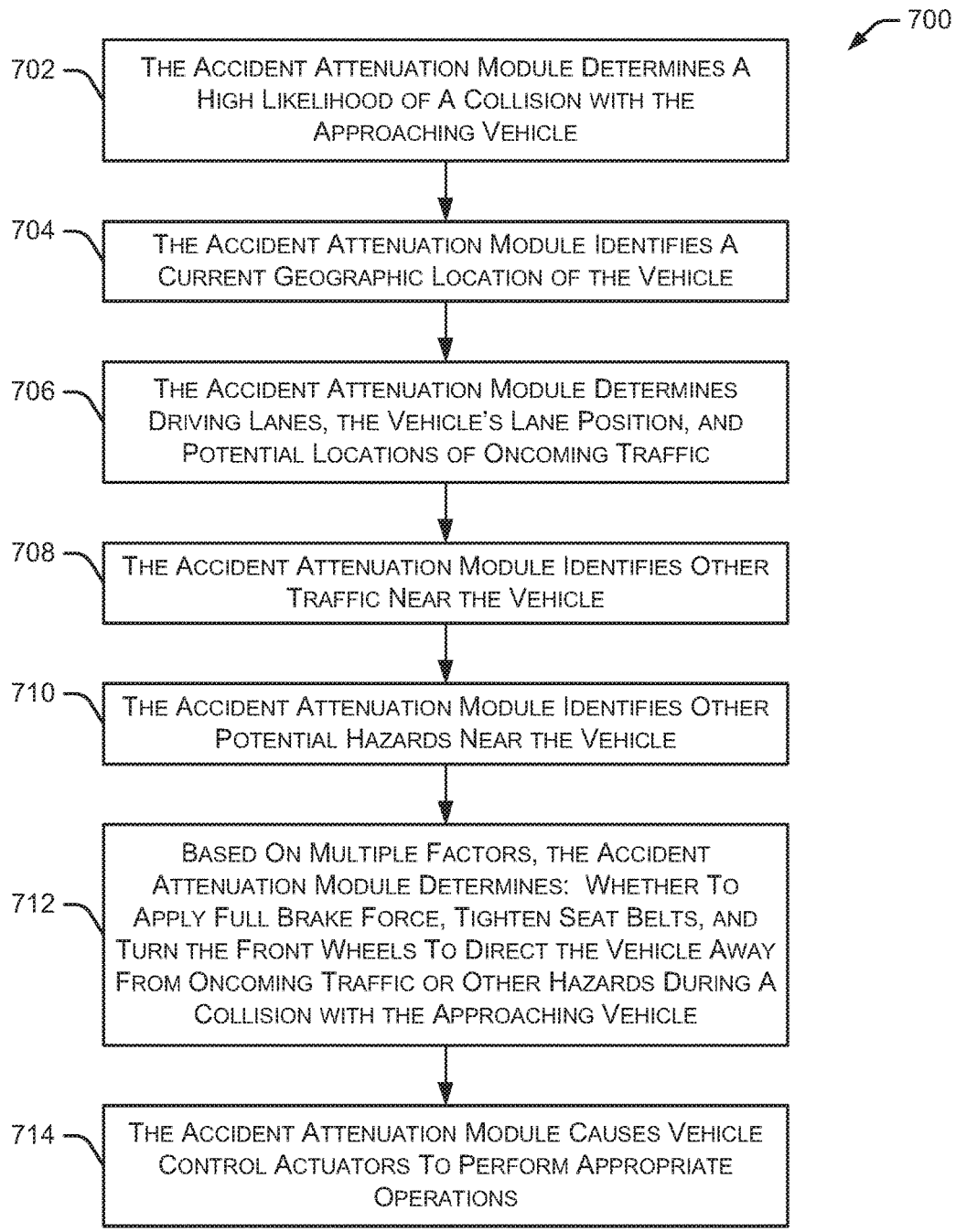
FIG. 7 is a flow diagram illustrating an embodiment of a method for determining which vehicle-related action to perform in response to a likely collision.

FIG. 7 is a flow diagram illustrating an embodiment of a method 700 for determining which vehicle-related action to perform in response to a likely collision. Initially, the accident attenuation module determines a high likelihood of collision with the approaching vehicle at 702, as discussed above with respect to FIG. 5. The accident attenuation module identifies a current geographic location of the vehicle at 704 using, for example, data from a GPS in the vehicle. The accident attenuation module also determines driving lanes, the vehicle's current lane position, and potential locations of oncoming traffic at 706 based on map data and other information associated with the vehicle's current geographic location.

Method 700 continues as the accident attenuation module identifies other traffic near the vehicle at 708. This traffic may be oncoming traffic, vehicles traveling in the same direction, or cross traffic. The accident attenuation module then identifies other potential hazards near the vehicle at 710, such as pedestrians, bicyclists, animals, other vehicles, buildings, steep drops at the edge of the roadway, and the like. Based on the multiple factors discussed herein, the accident attenuation module determines at 712 whether to apply full brake force, tighten seat belts, and turn the front wheels of the vehicle to direct the vehicle away from oncoming traffic or other hazards during a collision with the approaching vehicle. In some embodiments, the accident attenuation module may perform one or more of the three actions mentioned above (i.e., apply full brake force, tighten seat belts, and turn front wheels of the vehicle). Finally, the accident attenuation module causes vehicle control actuators (such as brake actuators, seat belt actuators, and steering actuators) to perform appropriate operations at 714.

In an alternate embodiment, method 700 also determines whether there is any oncoming traffic that poses a threat to the vehicle. For example, if the vehicle is on a one-way road with no cross streets near the vehicle, then there is no significant risk of oncoming or cross traffic. In this situation, the accident attenuation module may determine that the severity of the potential collision is best attenuated by creating an "elastic collision" that allows the energy from the collision to be transferred through the vehicle instead of having the vehicle absorb all of the energy. An elastic collision is created by releasing the brake of the vehicle and shifting the vehicle's transmission to a neutral position. Thus, when the collision occurs, a portion of the energy transfers through the vehicle and the vehicle moves forward. Since there is minimal likelihood of oncoming or cross traffic, forward movement of the vehicle is not likely to result in a subsequent collision with another vehicle.

While various embodiments of the present disclosure are described herein, it should be understood that they are presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the described exemplary embodiments, but should be defined only in accordance with the following claims and their equivalents. The description herein is presented for the purposes of illustration and description. It is not intended to be exhaustive or to limit the disclosure to the precise form disclosed. Many modifications and variations are possible in light of the disclosed teaching. Further, it should be noted that any or all of the alternate implementations discussed herein may be used in any combination desired to form additional hybrid implementations of the disclosure.

The invention claimed is:

1. A method comprising:
   determining, by a computer in a first vehicle, a speed of a second vehicle approaching from behind the first vehicle;
   determining, by the computer, a distance between the first and second vehicles;
   determining, by the computer, whether the second vehicle can stop before colliding with the first vehicle; and
   when the second vehicle cannot stop before colliding:
      identifying, by the computer, a current geographic location of the first vehicle according to an output of a GPS (global positioning system) receiver;
      identifying, by the computer, driving lanes proximate the first vehicle from map data based on the current geographic location of the first vehicle;
      determining, by the computer, the first vehicle's current lane position in the driving lanes based on the map data and the current geographic location of the first vehicle;
      determining, by the computer, the potential locations of oncoming traffic based on the map data and the current geographic location of the first vehicle; and
      adjusting, by the computer, a steering angle of the first vehicle such that an impact from behind will not urge the first vehicle into the potential locations of oncoming traffic.

2. The method of claim 1, wherein determining a speed of the second vehicle includes receiving data from at least one sensor mounted to the first vehicle.

3. The method of claim 2, wherein the sensor mounted to the first vehicle is one of a Radar sensor, a LIDAR sensor, an ultrasound sensor or a camera.

4. The method of claim 1, wherein determining a distance between the first vehicle and the second vehicle includes receiving data from at least one sensor mounted to the first vehicle.

5. The method of claim 4, wherein the sensor mounted to the first vehicle is one of a Radar sensor, a LIDAR sensor, an ultrasound sensor or a camera.

6. The method of claim 1, wherein determining whether the second vehicle can stop before colliding with the first vehicle includes determining the estimated braking capability of the second vehicle.

7. The method of claim 1, further comprising identifying an oncoming vehicle approaching the first vehicle and determining whether the wheels of the first vehicle are positioned to direct the first vehicle away from the oncoming vehicle.

8. The method of claim 1, further comprising deactivating the method in response to detecting movement of the first vehicle above a threshold speed.

9. An apparatus comprising:
   a communication manager configured to receive image data from a rear-facing camera mounted to a first vehicle;
   a speed calculation module configured to determine a speed of a second vehicle approaching from behind the first vehicle;
   a distance calculation module configured to determine a distance between the first vehicle and the second vehicle;
   a collision estimation module configured to determine whether the second vehicle can stop before colliding with the first vehicle based on a size and a type of the second vehicle; and
   an evasive action manager configured to take action to attenuate the severity of the potential collision responsive to the collision estimation module determining that the second vehicle cannot stop before colliding with the first vehicle.

10. The apparatus of claim 9, wherein the action taken by the evasive action manager includes at least one of: applying full brake force in the first vehicle, tightening seat belts in the first vehicle, and turning the front wheels of the first vehicle to direct the first vehicle away from oncoming traffic.

11. The apparatus of claim 9, wherein the communication manager is further configured to receive sensor data from a plurality of sensors associated with the first vehicle, and further comprising a sensor data analysis module configured to analyze the received sensor data.

\* \* \* \* \*